(12) United States Patent
Wheeler et al.

(10) Patent No.: US 7,032,112 B2
(45) Date of Patent: *Apr. 18, 2006

(54) ACCOUNT AUTHORITY DIGITAL SIGNATURE (AADS) SYSTEM USING TRANSACTIONAL ACCOUNT INFORMATION

(75) Inventors: Henry Lynn Wheeler, Greenwood Village, CO (US); Anne M. Wheeler, Greenwood Village, CO (US)

(73) Assignee: First Data Corporation, Greenwood Village, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/711,127

(22) Filed: Aug. 25, 2004

(65) Prior Publication Data

US 2005/0005117 A1    Jan. 6, 2005

Related U.S. Application Data

(63) Continuation of application No. 09/189,159, filed on Nov. 9, 1998, now Pat. No. 6,820,202.

(51) Int. Cl.
*H04L 9/00* (2006.01)

(52) U.S. Cl. ............... 713/182; 713/156; 713/175; 713/176; 380/282; 380/285; 705/64

(58) Field of Classification Search ............... 713/172, 713/176, 182; 380/282, 285; 705/57, 64, 705/67

See application file for complete search history.

(56) References Cited

U.S. PATENT DOCUMENTS

| | | | | |
|---|---|---|---|---|
| 5,029,208 | A | * | 7/1991 | Tanaka ..................... 380/279 |
| 5,422,953 | A | * | 6/1995 | Fischer ..................... 713/172 |
| 5,502,766 | A | * | 3/1996 | Boebert et al. ............ 713/193 |
| 5,825,884 | A | * | 10/1998 | Zdepski et al. ............... 705/78 |
| 5,870,475 | A | * | 2/1999 | Allan et al. ................. 380/282 |
| 6,061,794 | A | * | 5/2000 | Angelo et al. ............. 713/200 |
| 6,061,799 | A | * | 5/2000 | Eldridge et al. ........... 713/202 |
| 6,510,516 | B1 | * | 1/2003 | Benson et al. ............. 713/167 |
| 6,523,067 | B1 | * | 2/2003 | Mi et al. ................... 709/229 |
| 6,532,451 | B1 | * | 3/2003 | Schell et al. ................ 705/54 |
| 6,571,339 | B1 | * | 5/2003 | Danneels et al. .......... 713/201 |
| 6,587,837 | B1 | * | 7/2003 | Spagna et al. ............... 705/26 |

* cited by examiner

*Primary Examiner*—Kambiz Zand
(74) *Attorney, Agent, or Firm*—Morris, Manning & Martin, LLP

(57) ABSTRACT

In a system for performing an action regarding an account in response to an electronic communication received from a sender by a receiver, wherein the electronic communication includes sender identity information associated with the account and a digital signature derived from an electronic message using a private key of a public-private key pair, and wherein the public key of the pair has been associated with the account by the receiver such that the public key is retrievable based on the sender identity information, a method of validating the identity of the sender for the electronic communication includes: (a) retrieving the public key based on the received sender identity information; and (b) comparing a function of the public key and the digital signature with a function of the electronic message. Neither a PIN nor a password is required to be transmitted to the receiver for validating the identity of the sender.

38 Claims, 9 Drawing Sheets

ACCOUNT AUTHORITY DIGITAL SIGNATURE (AADS) SYSTEM USING TRANSACTIONAL ACCOUNT INFORMATION

CROSS REFERENCE TO RELATED APPLICATIONS

This application is a continuation of and claims the benefit under 35 U.S.C. Section 120 to Wheeler et al., U.S. patent application Ser. No. 09/189,159, titled "Account Authority Digital Signature (AADS) System," filed Nov. 9, 1998, now U.S. Pat. No. 6,820,202, which application is hereby incorporated herein by reference. This application is also related to U.S. patent application Ser. No. 09/860,083 titled "Three Party Account Authority Digital Signature (AADS) System," filed May 17, 2001; U.S. patent application Ser. No. 10/011,496 titled "Account Authority Digital Signature (AADS) Accounts," filed Dec. 5, 2001; U.S. patent application Ser. No. 10/090,091 titled "Sending Electronic Transaction Message, Digital Signature Derived Therefrom, And Sender Identity Information In (AADS) System" filed Mar. 4, 2002, now U.S. Pat. No. 6,820,199; and U.S. patent application Ser. No. 10/710,972 titled "Account Authority Digital Signature (AADS) System Using Encoded Information," filed Aug. 16, 2004.

BACKGROUND OF INVENTION

The field of the invention relates to digital signatures, and particularly, using digital signatures to reliably identify a sender and the accuracy of an electronic message without using certification authorities.

The increase in electronic commerce has increased the focus on security of the electronic transactions using this medium of commerce. In the world of computer transactions and electronic contracts, there is no face-to-face acknowledgement to identify the consumer or other person wishing to perform the transaction. As institutions become more reliant on computers, they have modified their business infrastructure (i.e., their "business process") in an attempt to keep up with electronic commerce. The business process of an institution includes the methods used to interact with a customer (e.g., how transactions occur, what information is required from the customer, help desks to support the customer), the information contained in customer accounts, the databases used and how they are modified by the institution, and personnel training.

Institutions and persons desiring to utilize electronic commerce are faced with several issues regarding electronic transactions. The first issue is whether the person requesting the transaction is who they say they are ("identification"). And the second issue is whether the requested transaction is actually the transaction intended to be requested ("accuracy"). In other words, whether the requested transaction has been compromised, either fraudulently or through transmission errors, during the course of transmitting and receiving the request.

To address the identity, of the person requesting the transaction, current financial business processes bind information in accounts to authenticate non-face-to-face transactions. For example, an account holder's mother's maiden name, a personal identification number (PIN), and a social security number have all been used and integrated into the current financial infrastructure to aid in reliably identifying someone requesting a non-face-to-face transaction.

To address the accuracy of the electronic message being sent and the identity of the person sending the electronic message, digital signatures are utilized. Digital signatures are used with electronic messages and provide a way for the sender of the message to electronically "sign" the message as a way of providing proof of the identity of the sender and the accuracy of the message. In a digital signature system, a sender digitally "signs" the message using a private key (encryption software used to create a digital signature). The receiver validates the sender's digital signature by using the sender's public key (software used to decrypt the digital signature) sent to the receiver by the sender.

While, digital signatures provide some assurance of accuracy for the message and the identity of the sender, they are also subject to security risks. These risks include compromised private and public keys or merchant fraud. To address the security risks and validate the digital signatures, computer technology has developed "certification authorities" to be used in a Certificate Authority Digital Signature ("CADS") system. In a CADS system, certification authorities are third parties that essentially "vouch" for the validity of a digital signature's public key and, hence, the validity of the digital signature.

However, certification authorities used in the CADS system come with inherent risks, such as an expired certification authority and a compromised private key, which affect the entire public key infrastructure. In addition, the increased reliability provided by certification authorities does not easily combine with the business process currently established.

Therefore, there is a need in the art for a method to increase the reliability of electronic transactions while not imposing significant modifications on the business processes already in place.

SUMMARY OF INVENTION

The present invention meets the needs described above by providing a method of reliably identifying the sender of an electronic message and determining the accuracy of an electronic message while utilizing the current standard business processes.

The current financial infrastructure can extend existing business processes to support high integrity electronic commerce by implementing the present invention. One embodiment of the present invention can be implemented as the Account Authority Digital Signature (AADS) system. The AADS system uses digital signatures along with validation procedures that can be implemented within current institutional business processes to identify a sender of an electronic message and determine the accuracy of the electronic message being sent.

The present invention simplifies its implementation by leveraging existing account infrastructures and by operating within existing business processes. In addition, the present invention utilizes electronic signatures in the business process for increased reliability. Yet, however, the present invention does not rely on third parties (i.e., certification authorities) for authorization, thereby avoiding any security risks or other systemic risks associated with the third parties. And finally, no new databases need to be developed to implement the present invention.

Generally described, the identity of a sender of an electronic message is validated by using sender validation information along with other sender identity information stored at an institution's or person's computer system and applying the sender validation information to the encoding information received by the computer system. The sender validation information is the sender's public key in a digital signature system.

The present invention utilizes the accuracy of electronic encoding, e.g., digital signatures, and provides a method to incorporate them into the current business processes. An institution records an encoding key (public key) and associates it with account information from the sender. This initial recording may be performed using any of the validation procedures utilized today by a business institution, for example, when the sender is opening a new account and must show proof of identity.

After the initial validation of the encoding key, validating future electronic transactions occur by including encoding information that can be deciphered using the valid encoding key initially stored. To validate an electronic transaction, the sender sends the electronic transaction message, the encoding information and sender identity information to the person or institution from which the sender desires validation. Having received this information, the computer system automatically retrieves the encoding key stored in the computer system that is associated with the sender identity information. The computer system then validates the electronic transaction message by applying the retrieved encoding key to the encoding information and analyzes the electronic transaction message to validate the identity of the sender and the accuracy of the message.

This validation may be performed in a digital signature system by applying a hashing algorithm to the electronic message and comparing the results to the results of applying the public key to the digital signature received.

The encoding information may be entered into a terminal by means of a smart card or by means of another computer system. The encoding information, electronic message and sender identity information may be sent to the computer system performing the validation via a closed network or via an open network, such as the Internet.

These and other advantages of the present invention will be more clearly understood and appreciated from a review of the following detailed description of the disclosed embodiments and by reference to the appended drawings and claims.

DETAILED DESCRIPTION

The present invention provides a method for reliably identifying the sender of an electronic method and determining the accuracy of an electronic message while utilizing current standard business processes.

Electronic commerce is currently used and implemented in several existing systems. The conventional debit card system is one example. The debit card system attempts to identify the sender of the electronic message (e.g., the message of "Withdraw $200 from my account") while working in the current business processes. In other words, it utilizes a PIN as merely another validation mechanism. However, the debit card system does not verify the accuracy of the message. In addition, because of the security risks, the debit card system is not utilized on an open network, such as the Internet, thereby limiting it's access to electronic commerce.

Figure 2:
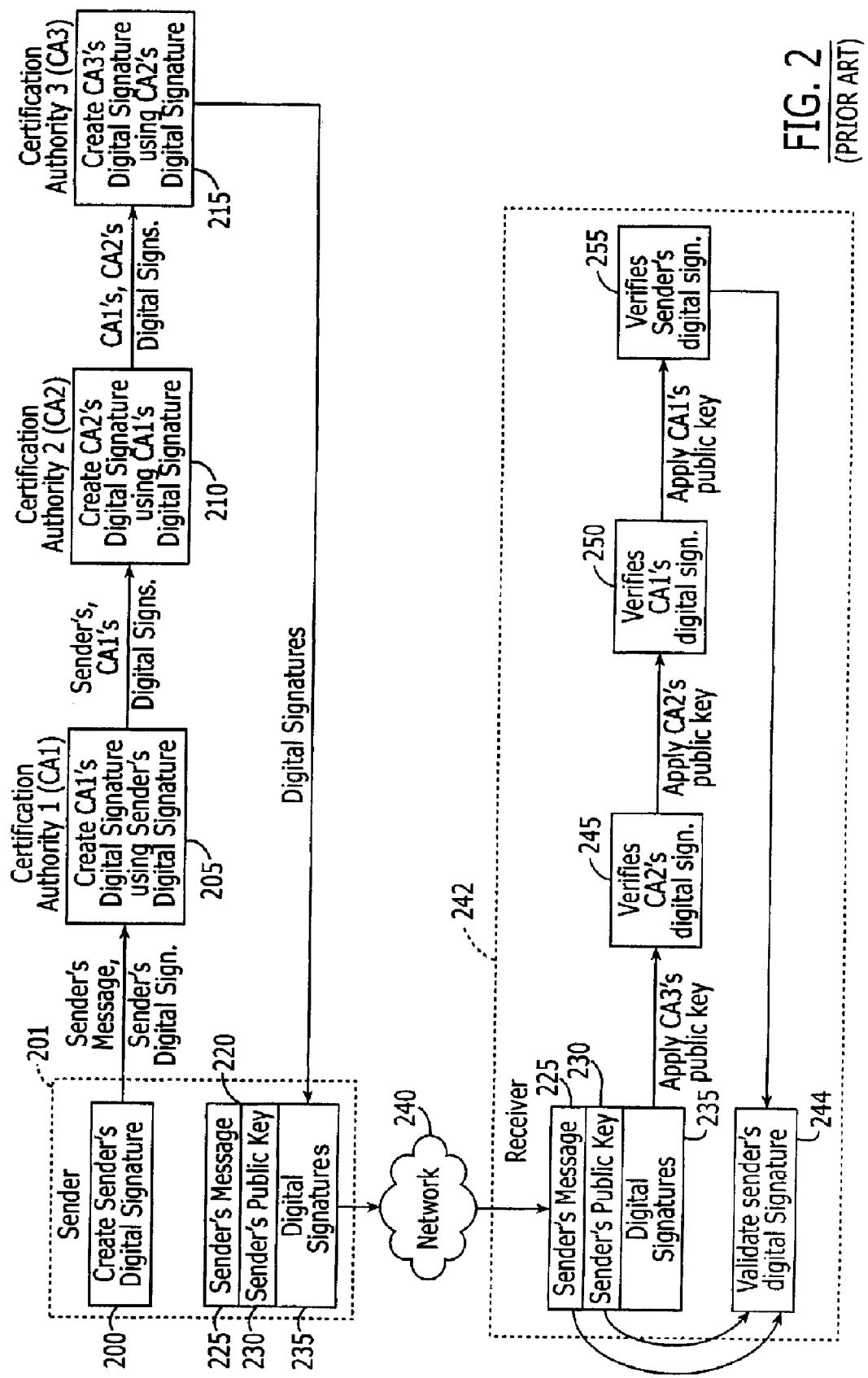
FIG. 2 is a block diagram depicting a Certification Authority Digital Signature (CADS) system of the prior art.

The Certification Authority Digital Signature (CADS) system of FIG. 2 is another example of a system for implementing electronic commerce. The CADS system provides message accuracy and may be used in open networks, such as the Internet. However, CADS also has inherent systemic risks and requires reliance on third parties to "authorize" the digital signature of the sender of the electronic message. In addition, the CADS system is difficult to implement using standard business processes utilized today.

Both the debit card system and the CADS system can have severe consequences in the event the security of either system is compromised. The debit card and CADS systems, as well as the security risks associated with each, are discussed further in FIGS. 1–2 and 3–4.

Figure 1:
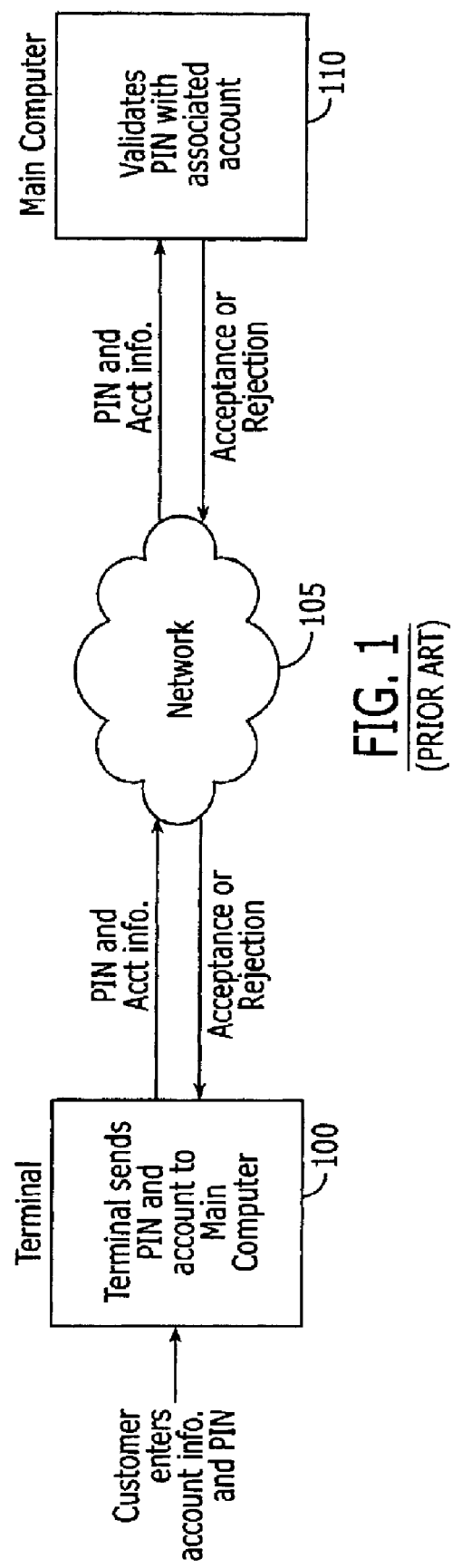
FIG. 1 is a block diagram depicting an exemplary debit card system as it exists in the prior art.

Turning now to the figures, FIG. 1 is a block diagram depicting a conventional debit card system as it exists in the prior art. Typically, a customer enters account information and a personal identification number (PIN) into a terminal 100. The account information is generally stored on magnetic tape attached to a card that is given to the customer so that the customer may enter it into the terminal 100. Upon entering the account information and the PIN, the terminal then formats this data and sends it across a closed network 105 to the main computer 110 that validates the PIN with an associated account that has been entered by the customer. The PIN was stored in a field along with other account information in the main computer previously. The PIN is typically associated with the customer when the account is established but generally not through the network 105. Normal procedures provide for the customer to validate his/her identity when the account is opened or prior to associating a PIN to the customer's account. This would verify to the institution that the person establishing the account is who they claim to be and increases the reliability that the when the PIN is used, the customer assigned the PIN is the person using it.

Upon validating the PIN with the associated account, the main computer 110 then accepts or rejects the PIN and sends the results back through the network 105. The terminal, having received the acceptance or rejection, then either continues to process the customer's transaction or denies customer access to the account.

The PIN used in the debit card system is the same for all transactions. In other words, no matter what transaction the customer wishes to initiate with the main computer, i.e., regardless what message is sent to the main computer by way of the terminal, the PIN stays exactly the same.

The terminal 100 used in the debit card system is a basic terminal that is used to format the entered information to send to the main computer 110. In addition, the terminal 100 may perform some function such as dispensing cash or other functions specific to the account. However, the terminal 100 is generally a dumb terminal only used to facilitate the customer's interaction with the main computer 110 (i.e., the terminal is not typically used for purposes other than to interact with financial institutions). The terminal 100 communicates with the main computer 110 by network 105.

The network 105 used in the debit card system is typically a closed network that is set up specifically for use between the terminal 100 and main computer 110. While it is possible that others may break into the network, generally, the network 105 is not used for other traffic other than messages sent between the terminal 100 and main computer 110.

The main computer 110 used in the debit card system is generally housed at the institution containing the account and contains all the records for the institution relative to the account and the PIN. When the account is initially set up, all information required to process this transaction as well as potentially other transactions within the institution is validated. For security reasons, the required information was validated in either face-to-face or in some other manner that can validate the customer's identity. Consequently, there is a direct validation of the account to the customer when the account is established. As stated earlier, the business processes set up in many financial institutions today follow this model. These processes include manuals, computer databases and records, held desks and personnel training.

FIG. 2 is a block diagram depicting a Certification Authority Digital Signature (CADS) system of the prior art. The CADS system relies on the digital signatures and traditional public key infrastructure in issuing certificates that are signed by a certification authority (see FIG. 3 regarding a description of digital signatures and their usage). A certification authority attests to the validity of the public key and sometimes, depending on the authority, checks the validity of the private key and the identity information of the entity that the certificate is issued to. The sender then sends the certificate, which in this case is a digital signature incorporating the sender's digital signature, issued by the certification authority; the message; and the sender's public key to the receiving party. The intent is that the receiving party will trust the certification authority's verification and also will be able to validate the certification authority's digital signature and the sender's message using the contents of the information sent by the sender and a public key of the certification authority.

In FIG. 2, the sender 201 creates a digital signature using the sender's message 225 (Additional discussion on creation of a digital signature is provided below in relation to FIG. 3). Prior to sending the message to the receiver 242, it is preferable to validate the sender's message and therefore the sender submits the message and the digital signature to a certification authority. The intent of the certification authority is to confirm that the identified sender is sending the message. Continuing with FIG. 2, the sender then has the digital signature "authorized" by a Certification Authority 1 (CA1) 205. The CA1 has, in advance, identified the public key associated with the sender. Therefore, the CA1 205 checks the current digital signature with the public key of the sender. Upon a successful check, the CA1 205 then creates a digital signature by digitally signing the sender's digital signature.

An example of a certification authority includes certifying the identity of specific banks. However, as there are no rules or laws regarding who is a certification authority and who is not and, in some instances, the receiver may not "trust" the certification authority. The receiver might be a large scale institution that does not trust a certification authority that deals with just a few customers or small institutions. Specifically, the receiver may not trust that the security is as high as it expects from the certification authority. Therefore, the receiver would require a higher-level certification authority. In cases like this, the digital signature of the first certification authority also needs to be authorized in like manner. This is depicted in FIG. 2 by CA1 sending its digital signature and the sender's digital signature to certification authority 2 (CA2) 210. CA2 is, in essence, an authority that confirms the identity of other first "level" certification authorities. In the example provided, CA2 may confirm the identity of a financial institution versus just a bank as in CA1.

This additional certification authority may still not rise to the level of security required by the receiver so yet another certification authority may be necessary. This is depicted by CA2 210 creating a digital signature using, i.e. by digitally signing, CA1's 205 digital signature and sending CA2's digital signature with CA1's digital signature on to CA3 215. CA3 215 could be just another higher-level certification authority that checks all institutions. And as is apparent, this hierarchy of certification authorities could continue ad infinitum. However, at some point, the sender and receiver are satisfied with the level of certification authorities and, in FIG. 2, ends with CA3 215. CA3's digital signature is created by digitally signing CA2's digital signature. The sender 201 then attaches the digital signatures 235 to the sender's message 225 along with the sender's public key 230 into a complete message block depicted by 220. The space required for the digital signature may be significant in relation to the message. Generally, the classic electronic transaction message comprises 80 bytes and the sender's digital signature comprises 60 bytes. However, for each certification, it requires another 2,000 bytes. The size of the message the sender is sending over the network 240 is increased substantially by using certification authorities. The sender then having combined the message 225, the sender's public key 230, and the digital signatures 235, sends this complete packet over the network 240 to the receiver 242.

The receiver now has to validate the sender's message to ensure that the authentic sender is sending the message and not a third party using the sender's identity. Having received the complete packet 220, the receiver 242 then begins applying public keys to the digital signatures received in the packet. Typically, the receiver will already have the public keys of the certification authorities used by the sender. In cases where it is not clear, the sender should also send the public keys to the receiver.

In the instance shown in FIG. 2, because CA3 was the final certification authority, the receiver then applies CA3's public key to CA3's digital signature of the digital signatures 235 that were received in the packet 220. Applying CA3's public key to the CA3s digital signature verifies CA2's digital signature. Now having CA2's digital signature 245, the receiver applies CA2's public key to CA2's digital signature 245 to verify that CA1's digital signature 250 is unmodified. The receiver then must apply CA1's public key to CA1's digital signature to verify that the initial sender's digital signature 255 is unmodified.

While it is shown that this process is performed three times because there have been three certification authorities, it will be recognized that this process would occur as many times as there are certification authorities used for the sender's message. It is clear that this process also adds significant overhead processing to the validation of the sender's identity. Particularly with the more certification authorities used, the processing and resources required purely for the task of validating the sender is increased dramatically.

Finally arriving at verification 255 of the sender's digital signature, the receiver then validates 244 the sender's message 225. The receiver does this by using the sender's message 225, the sender's public key 230 that had been sent in the initial packet 220, as well as the sender's verified digital signature 255 that was created from this process of certification authority validation just described. The receiver uses all these components to then validate at 244 the sender's digital signature. The receiver may send back the results of the validation, or if the validation was successful, act on the message sent.

While the CADS system depicted in FIG. 2 provides some degree of reliability confirming the sender's identity, standard business processes are not equipped to deal with these kinds of certification authority validation procedures.

Figure 3:
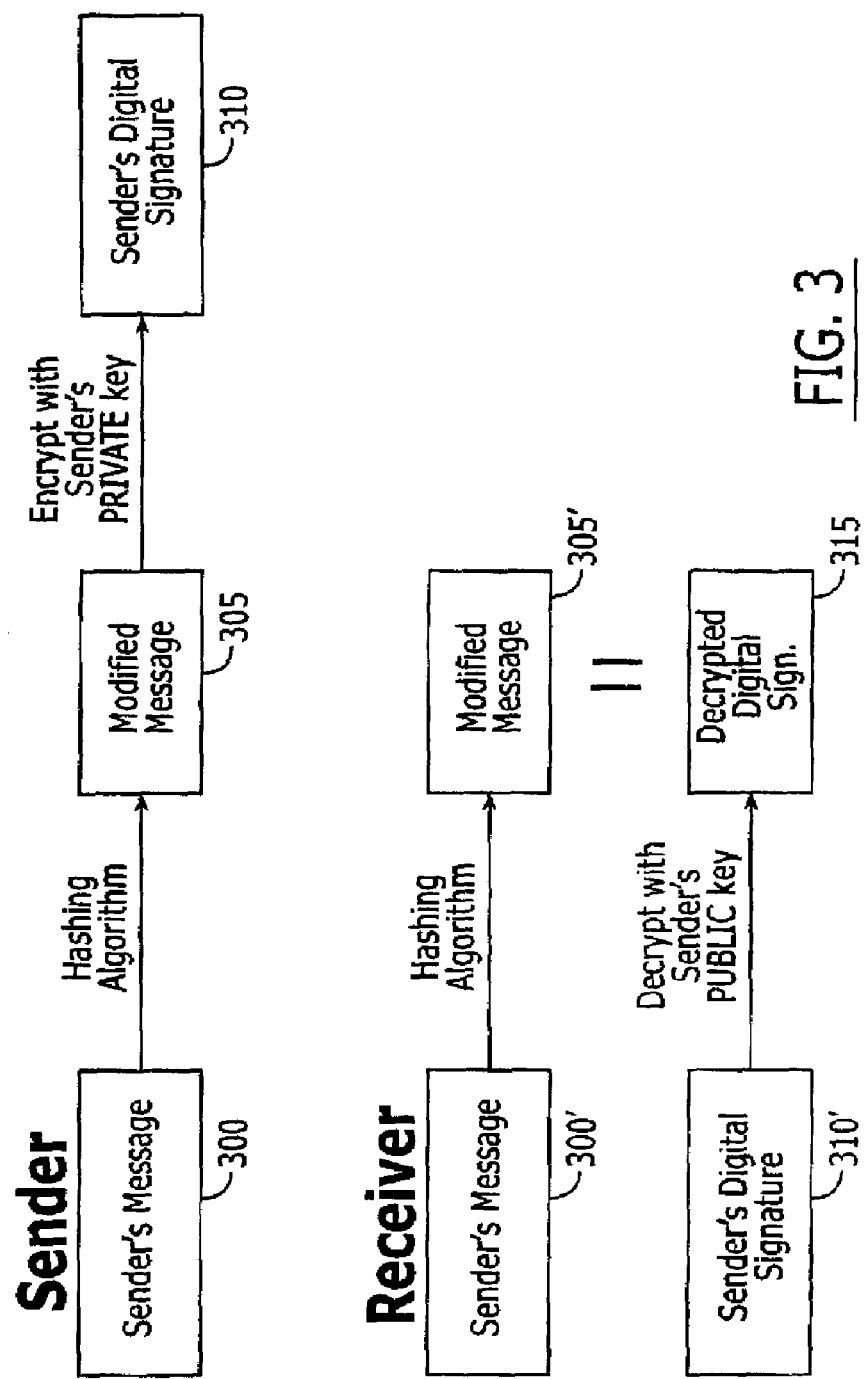
FIG. 3 is a block diagram depicting the digital signature process.

FIG. 3 depicts how a message is validated using the digital signature process. Initially, the sender creates a message 300 and applies a hashing algorithm to the message 300 to create a modified message 305. Because of the hashing algorithm, the modified message typically is a much smaller version of the actual message itself.

The modified message 305 that is created using the hashing algorithm and the sender's message 300 is not only smaller, but is also unique to the message. In other words, as the message changes, the modified message will also change after applying the hashing algorithm. The modified message is then encrypted with the sender's private key.

The process of using a digital signature generally requires a private and a public key. These keys are typically obtained from software houses and developers that create encryption programs. The private key is used by the sender and only by the sender. To maintain the security, as the name implies, the private key is intended to be kept private to the sender and not for public dissemination. This is the only time in the process, i.e., applying the private key to the modified message 305 to create the digital signature 310, where the private key is used.

The creation of the sender's digital signature described above in FIG. 3 can be performed at the sender's local computer, or in some cases, on a smart card. The use of smart cards are well known to those skilled in the art. The end result of the sender's process is that the sender has created a digital signature. And as stated, this digital signature is message specific, i.e., if any letter or any component of the message was changed, this digital signature would also change. The digital signature is also specific to the individual sender, i.e., the private key encryption method is only for that sender.

The sender then sends the sender's message with a public key, if the receiver does not already have one, and the digital signature to a receiver (this "sending" process is not shown). The receiver then takes the received message 300' and applies the same hashing algorithm described above for the sender to create the modified message 305. Ideally, this should result in a modified message 305' that is the same as the modified message 305. The only case where the sender's and receiver's modified message is different is if the message was corrupted either by the sender after having applied the digital signature to it, by transmission errors or someone fraudulently intercepting the message and attempting to change its contents.

Still referring to FIG. 3, next the receiver then takes the received digital signature 310' and applies the sender's public key to the digital signature. As implied, the public key is available for public use by the sender without losing any security of the sender's private key. The receiver then applies the public key to create the decrypted digital signature 315. The decrypted digital signature 315 and the modified message 305' are then compared by the receiver. If they both match and are identical, then the receiver knows that the message was encrypted with the sender's private key and was the same message that has been received. However, because it is not known for sure whether the sender's private key has been compromised (e.g., stolen), the receiver is still not absolutely sure that the sender identified in the message actually is the one who sent it.

Figure 4:
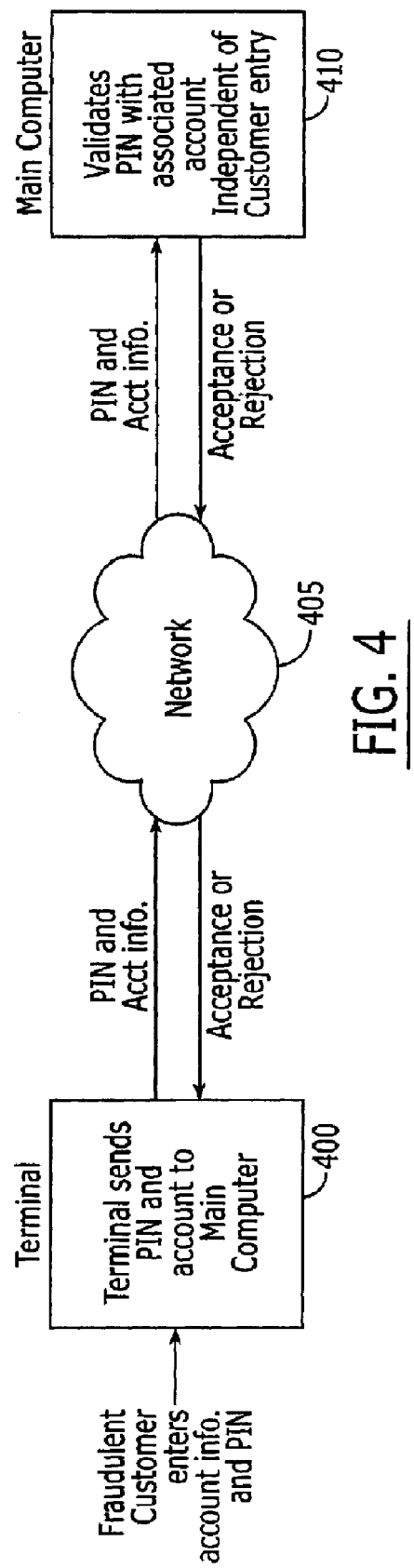
FIG. 4 is a block diagram depicting the effect of a security breach in the existing debit card system.

FIG. 4 is a block diagram depicting the effect of a security breach (e.g., someone stealing someone's PIN and account info.) in the existing debit card system. In this case, the fraudulent customer enters account information and a PIN to a terminal 400 and requests a transaction. The same PIN is used for all transactions and the PIN typically is an easily remembered non-complex set of numbers and/or letters that can be entered by the customer. Once the PIN has been compromised for one message, that same PIN can be used for other messages that the fraudulent customer wishes to send.

The terminal 400 having received the account information and PIN from the fraudulent customer then, as expected, sends this fraudulent information on to the main computer 410 through the network 405. The main computer 410 is not checking the message against the PIN. It merely receives the PIN and checks it against the account that has been stored already in the main computer 410. If the fraudulent customer has done his job and has stolen the correct PIN, then the transaction will be validated and the acceptance will be passed on and the fraudulent customer will have access to someone else's account.

Another area of concern, not depicted in FIG. 4, is when a third party steals the customer's PIN by tapping into the network 405. Since no encoding or encrypting is performed on the PIN, and since the same PIN is used for all messages, once someone has tapped into the network to obtain this information, that person is not required to perform any decryption on the message and can receive the PIN from the network. Once they have access to this PIN, they can then get into the customer's account and send any messages such as checking the account balance and withdrawing funds from the account. Having one PIN for all messages facilitates this type of security breach.

Figure 5:
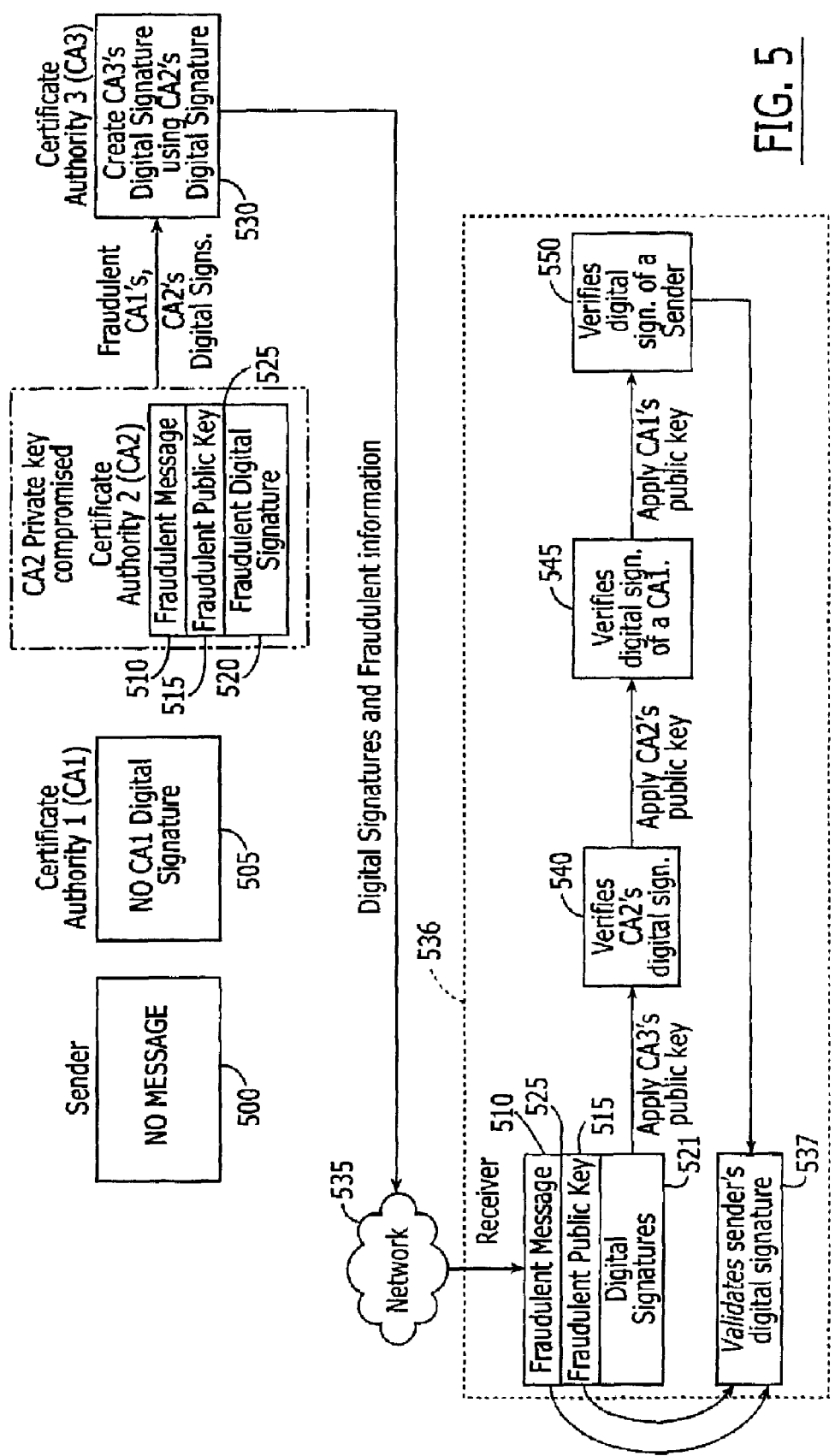
FIG. 5 is a block diagram depicting the effect of a security breach in the CADS system of FIG. 2.

FIG. 5 depicts the effect of a security breach, i.e., the stealing of a certification authority's private key by a third party, in the existing CADS system. When a certification authority's private key is stolen by a third party, all messages certified by that authority are suspect because the third party, not the certification authority, may generate false messages which appear to be authorized by the certification authority.

In this case, an authentic sender is not attempting to send a message 500, and in this example, CA1 has not applied any digital signature 505 because there is no message. But what has occurred is that there has been a security breach in the CA2. For example, CA2's private key has been stolen. In general, the effect of having the CA2's private key stolen is that it can then mask as any of the CA1s or senders relying on CA2 for certification even though they are not attempting to send any messages. In addition, a corrupted CA2 private key allows the creation of fictitious CA1s or senders that do not exist, yet will appear valid because they are certified by CA2. So, if a certification authority can validate that a specific merchant is requesting a transaction when that merchant is indeed not requesting a transaction, this facilitates the fraudulent use of the electronic commerce system.

Continuing with FIG. 5, a digital signature 520 of a sender is created for a fraudulent message 510 using a fraudulent public key 515. The fraudulent sender's digital signature 520 then is purportedly digitally signed by CA1, and the compromised private key of CA2 is used to digitally sign the fraudulent CA1's digital signature, thereby authorizing CA1's digital signature The CA1's and CA2's digital signatures then are sent to CA3 for validation. Because the private key of CA2 has been compromised, CA2's digital signature is validated by CA3 and, consequently, the digital signature and fraudulent message block 525 are forwarded on to the receiver 536 over the network 535.

The receiver then receives the fraudulent message 510, the fraudulent public key 515, and the digital signatures 521. The receiver then runs through the process as described in FIG. 2 to verify the digital signatures. The receiver applies CA3's public key to CA3's digital signature 530 and verifies 540 that CA2's digital signature is unmodified. It then applies CA2's public key to CA2's digital signature and verifies 545 that the fraudulent digital signature for CA1 is unmodified, even though CA1 has not digitally signed this message. The receiver then applies CA1's public key to what appears to be a legitimate digital signature of CA1 and verifies 550 that a fraudulent digital signature of the fraudulent sender is unmodified. This is the case even though the sender has not created a message, nor has CA1 validated it in any manner. The receiver, using the fraudulent digital signature verified at 550 and the fraudulent public key 515, then validates 537 the sender's purported message.

The present invention addresses the security needs identified above by providing a method of reliably identifying the sender of an electronic message and determining the accuracy of an electronic message while utilizing the current standard business processes. Below is a description of various embodiments of the present invention.

Exemplary Operating Environment

Figure 6:
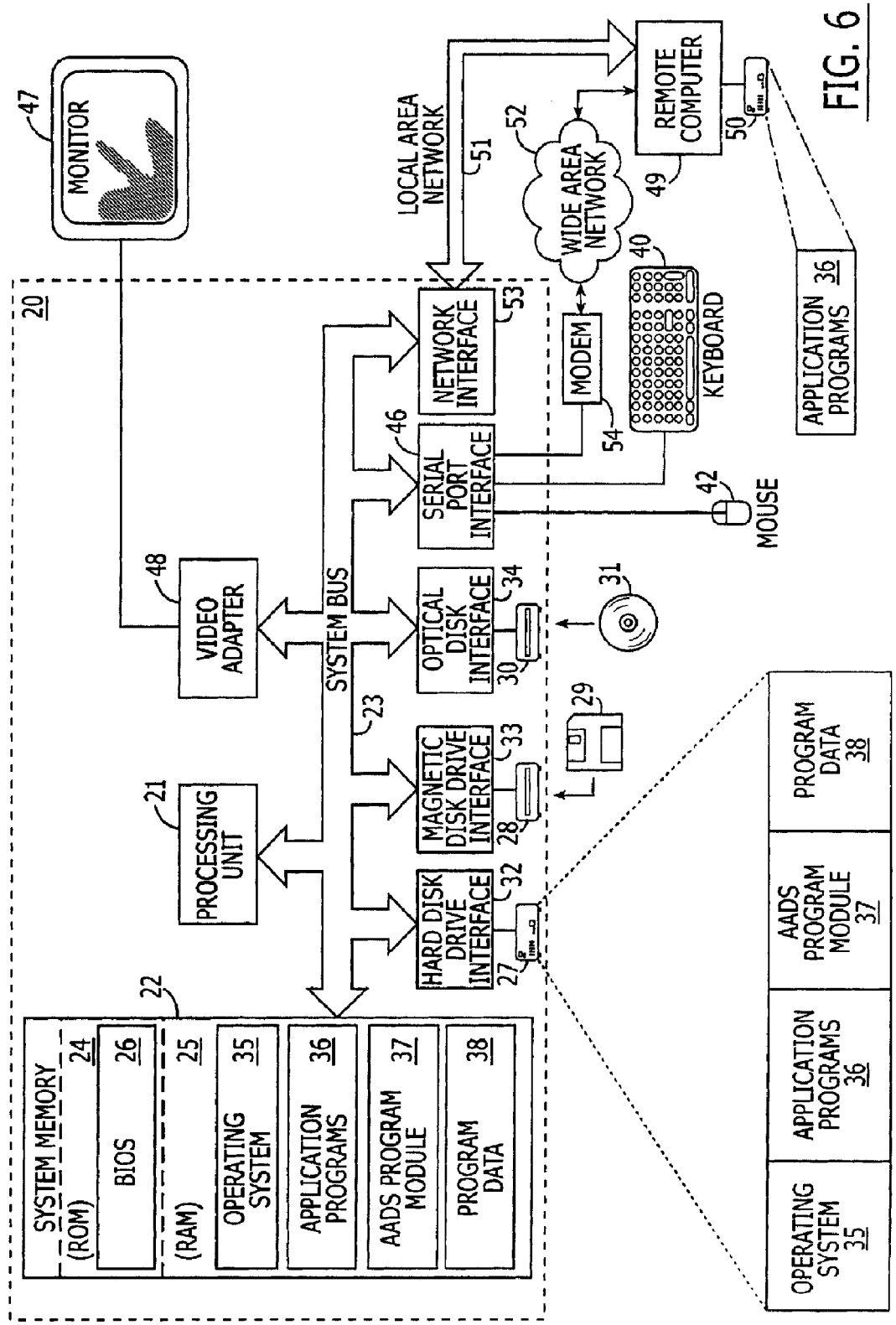
FIG. 6 is a block diagram of an exemplary computing environment in an embodiment of the present invention.

FIG. 6 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 6, an exemplary system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, the Account Authority Digital Signature (AADS) module 37, and program data 38. A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 6. The logical connections depicted in FIG. 6 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communication's link between the computers may be used.

Figure 7:
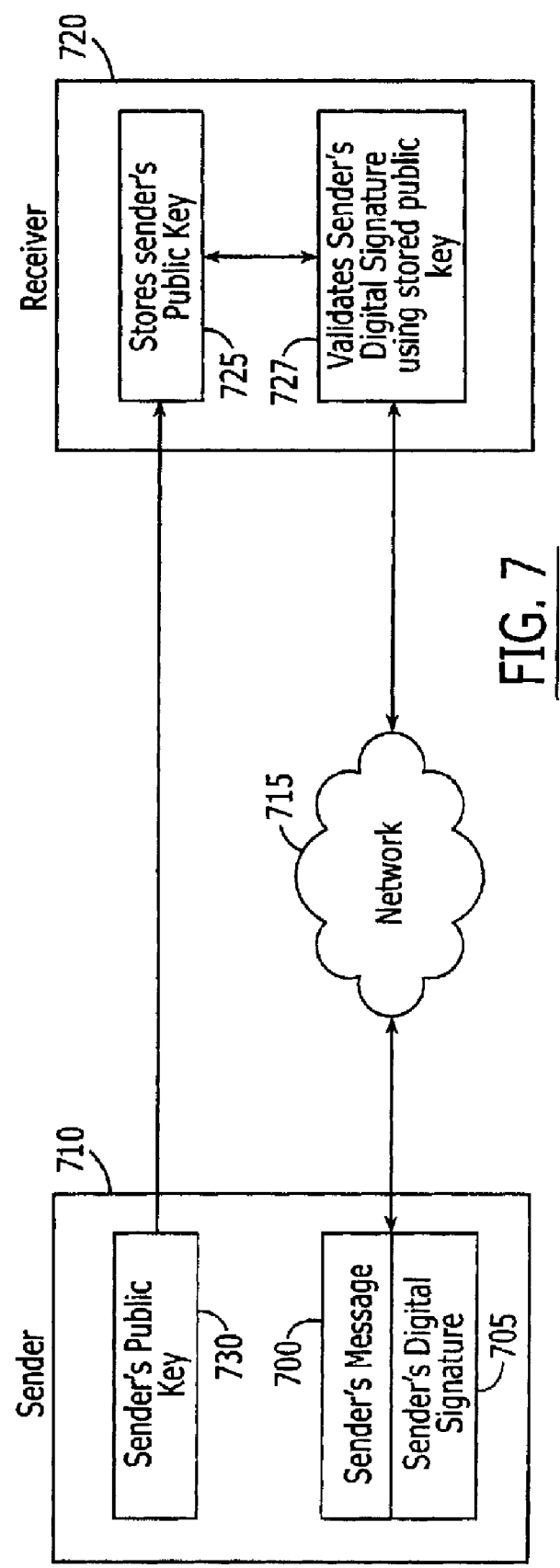
FIG. 7 is a block diagram of the components of an embodiment of the present invention.

FIG. 7 is a block diagram of the components of the preferred embodiment of the present invention. This embodiment of the present invention utilizes the paradigm of the digital signatures as described with respect to FIG. 3 and merges it into business processes utilized today.

Prior to sending a message to the receiver, the sender provides the sender's public key 730 to the receiver 720. The receiver then stores the sender's public key 725, which will be used to validate electronic messages that will be sent to the receiver. In one embodiment, the sender provides the public key to the receiver when the sender initially establishes an account with the receiver. It is preferable that the receiver stores the sender's public key along with other sender account information such as name, address, PIN, mother's maiden name, or other security information that is associated with an account. It is also preferable to not send the sender's public key to the receiver in the same electronic message that the sender desires to have validated.

The sender 710 then creates a sender's message 700 and attaches the digital signature 705. The digital signature was created by the process described either in FIG. 3 or by another process as known to those skilled in the art.

The sender sends the sender's message 700 and the sender's digital signature 705 to the receiver 720 by way of the network 715. The network 715 can either be a closed network as is used in the debit card system, or it can be an open network such as the Internet. Because the digital signature is applied, if 715 is an open network such as the Internet, there is a low probability that someone monitoring for traffic and trying to "steal" messages and private information will be able decrypt the digital signature of the sender.

Note that in this embodiment, the sender is not sending the public key with the message, and the sender is also not using any certification authorities to authorize this message. Also note that because the standard business process supports validation criteria, adding another criteria, such as a public key, requires minimal modification to the business process.

The receiver 720 then receives the sender's message 700 and the sender's digital signature 705. The receiver 720 then automatically retrieves the prestored public key associated with the sender's other account information and validates 727 the sender's digital signature using this prestored public key. Because a digital signature is being used, no one tapping into the network 715 will be able to modify the message as it proceeds to the receiver without then invalidating the digital signature. If the message is modified or corrupted in any manner, the message will fail the validation process and the receiver will refuse the request.

Figure 8:
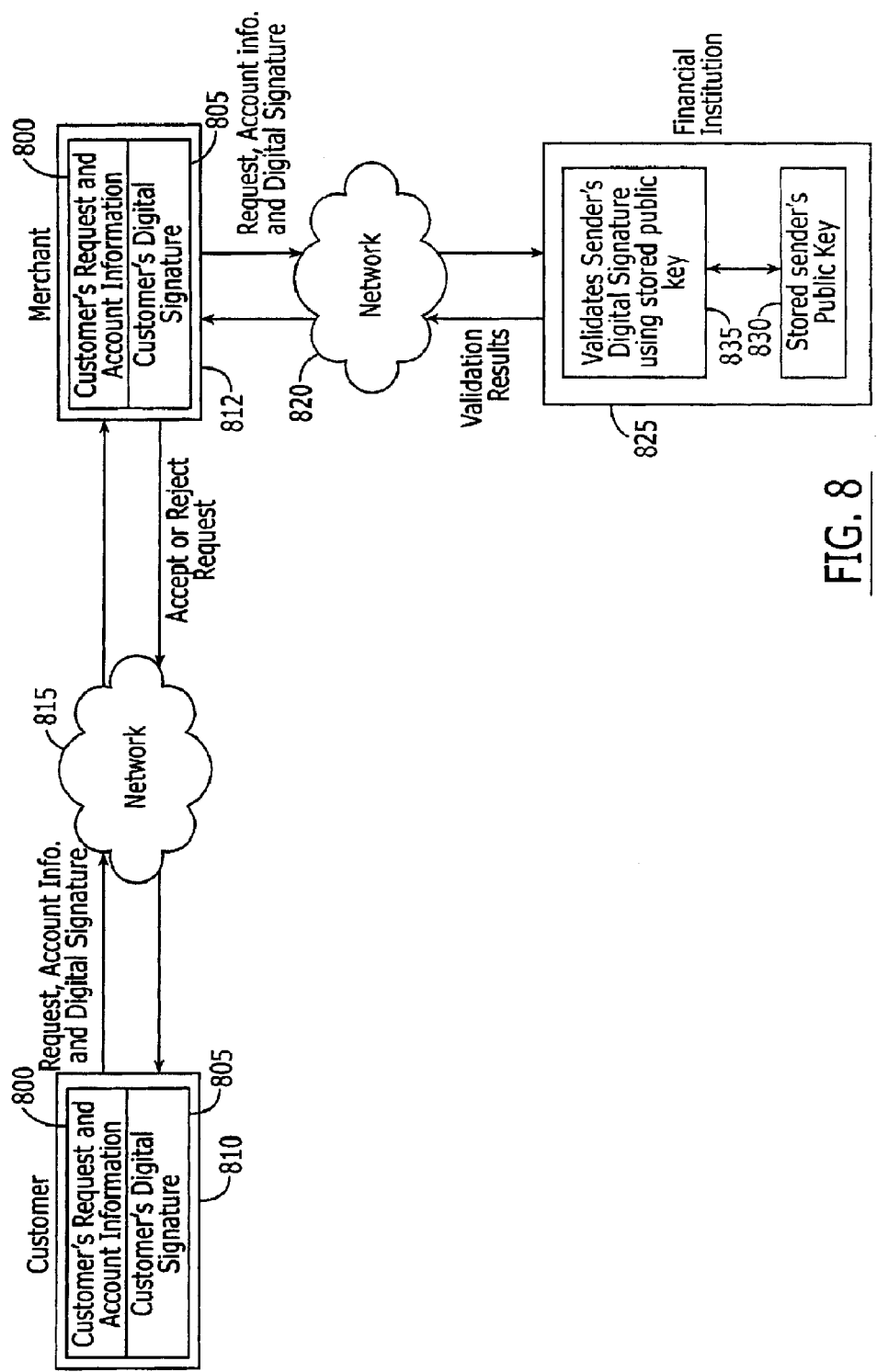
FIG. 8 is a block diagram depicting an embodiment of the present invention as it is implemented using a financial institution, a merchant and a customer.

FIG. 8 is a block diagram depicting an embodiment of the present invention as it is implemented using a financial institution 825, a merchant 812 and a customer 810. The present invention applies in situations where security and the sender's identification is required. One embodiment is a financial institution that uses standard business processes common in the industry today. In this embodiment, the customer 810 generates requests and provides account information 800, as well as generates a digital signature 805. The customer sends this information through the network 815 to the merchant 812. This information can be used under several situations. For example, if a customer is purchasing groceries at a supermarket and has a smart card that contains his or her private key, or when the customer is using his home computer and is trying to purchase a book or other goods over the Internet from a merchant.

The merchant 812 then receives the customer's request and account information 800 and the customer's digital signature 805. The merchant then seeks to have the financial institution authorize the transaction. In other words, the merchant wants the financial institution to confirm the identity of the customer 810 and confirm that there are enough funds in the account to make this purchase. In order to have the transaction authorized, the merchant sends this information to the network 820 to the financial institution 825 for validation. It will be noted that the merchant has not received the private or public key from the customer. The merchant has received a digital signature from the customer and that digital signature will only be valid for this specific request from the customer. If the request is modified in any way, the digital signature will become invalid. This is important because of the high incidence of merchant fraud perpetrated by merchants. So, if the merchant cannot modify the customer's request in any way without having the digital signature becoming invalid, this will provide a significant savings for the financial institutions and ultimately the customer as well.

The financial institution 825, having received the customer's request and account information 800, and the customer's digital signature 805, then automatically retrieves the public key 830 that has been previously stored and validates 835 the customer's digital signature using the prestored public key 830. Depending on the purpose for which the present invention is implemented, the institution may then act on the customer's request, such as to authorize a transaction involving the customer's account.

When the financial institution is performing an account authorization, any of the methods known to those skilled in the art may be employed while using the present invention. For example, the financial institution may employ a model using an authorization source and a transaction process. Under this model, when used with a credit card transaction, the authorization source interacts with the merchant to receive the customer account information and the transaction request. The transaction processor may be used to interact with the credit card issuing association to approve the transaction. Methods of account approval are many and are considered within the scope of the present invention when the validation of an electronic message is required.

The financial institution 825 then validates the account with the digital signature and returns the results of the validation through the network 820 to the merchant 812. The merchant then accepts or rejects the request by the customer 810, notifying the customer via the network 815. The networks 820 or 815 can be open networks such as the Internet, closed networks, or one could be an open network while the other is a closed network.

It should be noted that because the digital signature is encrypted, the public key is not being sent (i.e., the public key has been prestored at the institution), and no certification authorities are being used, the concern of fraudulent tapping into the network to retrieve sensitive customer or sender information has been greatly reduced. Further note that the merchant has only been a pass through mechanism to confirm the identity of the customer to the bank and to verify account information.

Figure 9:
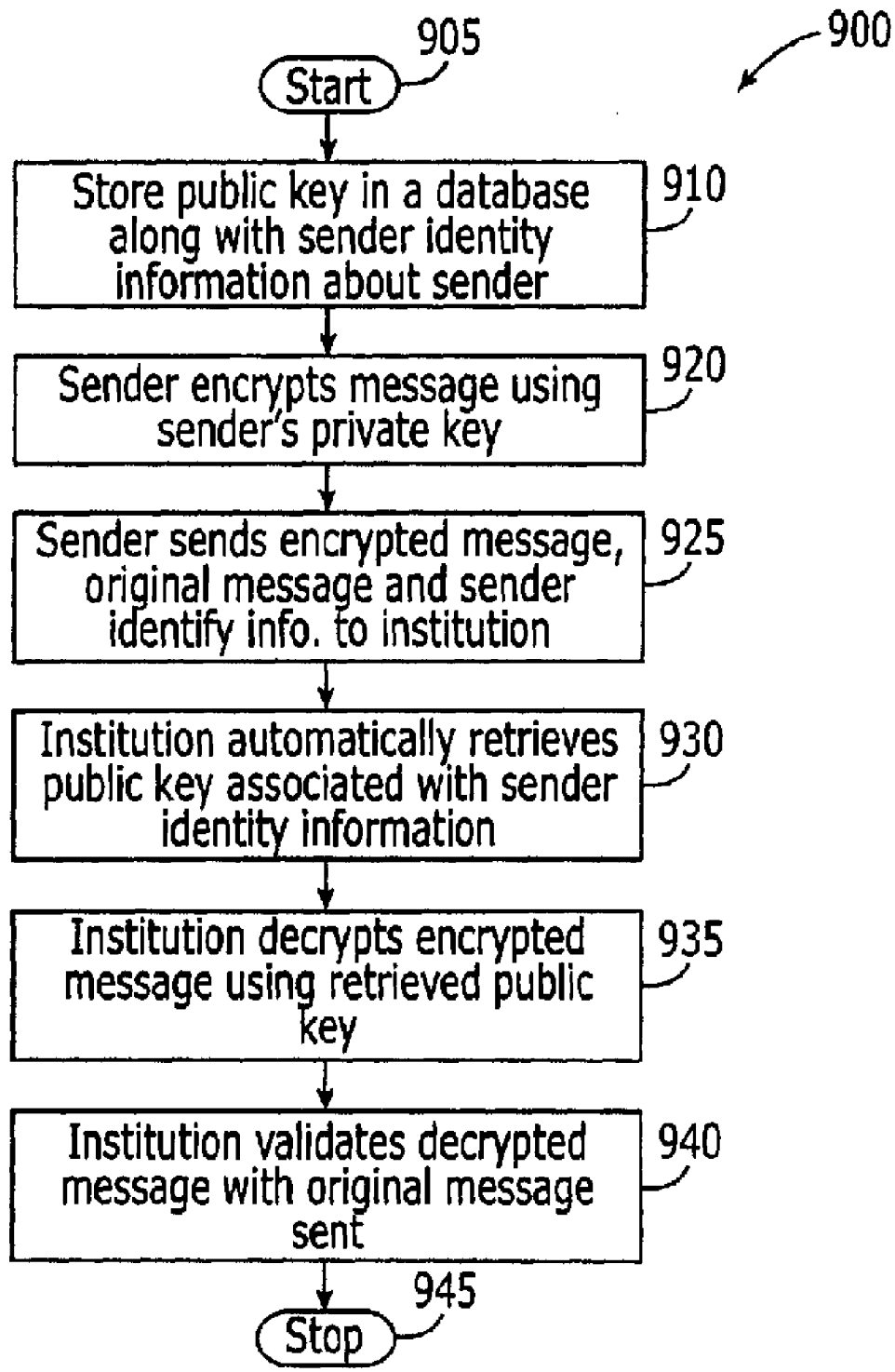
FIG. 9 is a flowchart depicting the steps performed in implementing an embodiment of the present invention.

FIG. 9 is a flow chart depicting the steps performed in implementing an embodiment of the present invention. Method 900 begins at the start (step 905) and proceeds to step 910 where public key information is stored in a database along with sender identity information about a sender. This may be performed in a manner well known, for example, when someone opens up a checking account and provides identity information, such as mother's maiden name, social security number or other types of information required by institutions that require a high level of confidence of the sender's identity. The sender identity information may be anything that the institution desires, such as account information, sender's name or any other information the institution wishes to use to associate the sender's public key to the sender.

Proceeding to step 920, the sender encrypts a message using the sender's private key. This may be performed using the digital signature methodology described with respect to FIG. 3, or may be used by other encryption methods known to those skilled in the art. After encrypting the message, the sender proceeds to step 925 where it sends the encrypted message, the original message, and the sender identity information to the institution. This may be performed over an open network, such as the Internet, where the sender is accessing via a computer, or it may be over a closed network where the sender is sending the encrypted message by way of a smart card at a terminal.

Proceeding to step 930, the institution receives the encrypted message, the original message, and sender identity information and automatically searches the database, using the sender identity information, to find the sender's public key. The public key that is associated with the sender identity information is then retrieved from the database. At step 930, the institution decrypts the encrypted message using the retrieved public key that was associated with the sender identity information provided in step 910.

Proceeding to step 940, the institution then validates the decrypted message with the original message sent. In one embodiment, the validation is performed using the digital signature validation paradigm previously described. After performing the validation, method 900 proceeds to step 945 and stops.

This validation process provides two purposes: (1) it determines whether the sender is the originator of the message because it is based on validation information provided by the sender to the institution; and (2) it validates the accuracy of the received message by detecting any changes to the message that was sent.

The present invention has been described in relation to particular embodiments which are intended in all respects to be illustrative rather than restrictive. Alternative embodiments will become apparent to those skilled in the art to which the present invention pertains without departing from its spirit and scope. Accordingly, the scope of the present invention is defined by the appended claims rather than the foregoing description.

What is claimed is:

1. In a system for performing an action, in response to an electronic communication regarding an account, which electronic communication is received from a sender by a receiver, a method comprising the steps of:
   (a) initially, associating by the receiver, sender identity information and a public key of a public-private key pair with the account such that the public key is retrievable based on the sender identity information, wherein the account comprises transactional account information, and wherein the public key is associated with the account in a computer database; and thereafter
   (b) receiving the electronic communication from the sender,
      (i) wherein the electronic communication was created after the association of the sender identity information and the public key with the account in step (a),
      (ii) wherein the electronic communication comprises,
         (A) the sender identity information, and
         (B) a digital signature derived from an electronic message using the private key of the pair, and
      (iii) wherein the electronic communication is communicated electronically from the sender; and
   (c) validating the identity of the sender for the electronic communication by only performing the steps of,
      (i) utilizing the sender identity information received in the electronic communication to retrieve the public key based on the association of the sender identity information and the public key with the account performed in step (a), and
      (ii) comparing a function of the public key and the digital signature with a function of the electronic message, wherein the function of the public key and the digital signature comprises decrypting the digital signature using the public key,
whereby a comparison resulting in a match validates the identity of the sender.

2. In a system for performing an action, in response to an electronic communication regarding an account, which electronic communication is received from a sender by a receiver, a method comprising the steps of:
   (a) initially, associating by the receiver, sender identity information and a public key of a public-private key pair with the account such that the public key is retrievable based on the sender identity information, wherein the account comprises transactional account information,
and wherein the public key is associated with the account in a computer database; and
thereafter
   (b) receiving the electronic communication from the sender,
      (i) wherein the electronic communication was created after the association of the sender identity information and the public key with the account in step (a),
      (ii) wherein the electronic communication comprises,
         (A) the sender identity information, and
         (B) a digital signature derived from an electronic message using the private key of the pair, and
      (iii) wherein the electronic communication is communicated electronically from the sender; and
   (c) validating the identity of the sender for the electronic communication by,
      (i) utilizing the sender identity information received in the electronic communication to retrieve the public key based on the association of the sender identity information and the public key with the account performed in step (a), and
      (ii) comparing a function of the public key and the digital signature with a function of the electronic message, wherein the function of the public key and the digital signature comprises decrypting the digital signature using the public key,
whereby a comparison resulting in a match validates the identity of the sender, and wherein neither a PIN nor a password is required to be transmitted to the receiver for validating the identity of the sender.

3. In a system for performing an action, in response to an electronic communication regarding an account, which electronic communication is received from a sender by a receiver, a method comprising the steps of:
   (a) initially, associating by the receiver, sender identity information and a public key of a public-private key pair with the account such that the public key is retrievable based on the sender identity information, wherein the account comprises transactional account information and the sender identity information comprises other than an account number, and wherein the public key is associated with the account in a computer database; and thereafter (b) receiving the electronic communication from the sender,
  (i) wherein the electronic communication was created after the association of the sender identity information and the public key with the account in step (a),
  (ii) wherein the electronic communication comprises,
    (A) the sender identity information, and
    (B) a digital signature derived from an electronic message using the private key of the pair, and
  (iii) wherein the electronic communication is communicated electronically from the sender; and (c) validating the identity of the sender for the electronic communication by,
  (i) utilizing the sender identity information received in the electronic communication to retrieve the public key based on the association of the sender identity information and the public key with the account performed in step (a), and
  (ii) comparing a function of the public key and the digital signature with a function of the electronic message, wherein the function of the public key and the digital signature comprises decrypting the digital signature using the public key, whereby a comparison resulting in a match validates the identity of the sender.

4. In a system for performing an action, in response to an electronic communication regarding an account, which electronic communication is received from a sender by a receiver, a method comprising the steps of:

(a) initially, associating by the receiver, sender identity information and a public key of a public-private key pair with the account such that the public key is retrievable based on the sender identity information, wherein the account comprises transactional account information, and wherein the public key is associated with the account in a computer database; and thereafter (b) receiving the electronic communication from the sender,
  (i) wherein the electronic communication was created after the association of the sender identity information and the public key with the account in step (a),
  (ii) wherein the electronic communication comprises,
    (A) the sender identity information, and
    (B) a digital signature derived from an electronic message using the private key of the pair,
  (iii) wherein the electronic communication is communicated electronically from the sender, and
  (iv) wherein the electronic communication is the only electronic communication received from the sender by the receiver relating to the action; and (c) validating the identity of the sender for the electronic communication by,
  (i) utilizing the sender identity information received in the electronic communication to retrieve the public key based on the association of the sender identity information and the public key with the account performed in step (a), and
  (ii) comparing a function of the public key and the digital signature with a function of the electronic message, wherein the function of the public key and the digital signature comprises decrypting the digital signature using the public key, whereby a comparison resulting in a match validates the identity of the sender.

5. The method of claim 1, 2, 3, or 4, wherein the electronic communication includes the electronic message.

6. The method of claim 1, 2, 3, or 4, wherein the electronic message is implied from the receipt of the electronic communication.

7. The method of claim 1, 2, 3, or 4, wherein the digital signature is derived within a smart card of the sender.

8. The method of claim 1, 2, 3, or 4, wherein the digital signature is received from the sender within a terminal of a third-party and then forwarded to the receiver.

9. The method of claim 1, 2, 3, or 4, wherein the electronic communication is received over a secure network.

10. The method of claim 1, 2, 3, or 4, wherein the electronic communication is received over an insecure network.

11. The method of claim 10, wherein the network comprises the Internet.

12. The method of claim 1, 2, 3, or 4, wherein the electronic communication is received encrypted.

13. The method of claim 1, 2, 3, or 4, wherein the electronic communication is received unencrypted.

14. The method of claim 1, 2, 3, or 4, wherein the receiver is a financial institution and the action on the account comprises a financial transaction.

15. The method of claim 1, 2, 3, or 4, wherein the electronic communication includes the public key.

16. The method of claim 1, 2, or 4, wherein the sender identity information comprises the account number.

17. The method of claim 1, 2, or 4, wherein the sender identity information comprises other than the account number.

18. The method of claim 1, 2, 3, or 4, wherein the public key was associated with the account when the account was first established.

19. The method of claim 18, wherein the public key was provided by the sender to the receiver.

20. The method of claim 18, wherein the public key was provided to the sender by the receiver.

21. The method of claim 1, 2, 3, or 4, wherein the transactional account information includes information required to process the action.

22. The method of claim 1, 2, 3, or 4, wherein the transactional account information includes a personal identification number (PIN).

23. The method of claim 1, 2, 3, or 4, wherein the transactional account information includes an account balance representing funds in the account.

24. The method of claim 1, 2, 3, or 4, wherein the transactional account information includes information validated when the account was established.

25. The method of claim 1, 2, 3, or 4, wherein the transactional account information includes information that was validated in a face-to-face acknowledgement between the sender and the receiver.

26. The method of claim 1, 2, 3, or 4, wherein the account comprises a checking account.

27. The method of claim 1, 2, 3, or 4, wherein the transactional account information includes a history of ledger transactions in the account.

28. The method of claim 1, 2, 3, or 4, wherein the transactional account information includes the social security number of the sender.

29. The method of claim 1, 2, 3, or 4, wherein the transactional account information includes the address of the sender.

30. The method of claim 1, 2, 3, or 4, wherein the transactional account information includes the mother's maiden name of the sender.

31. The method of claim 1, 2, 3, or 4, wherein the transactional account information includes entity information of the sender.

32. The method of claim 1, 2, 3, or 4, wherein the transactional account information only includes entity information of the sender.

33. The method of claim 1, 2, 3, or 4, wherein the transactional account information includes business process information.

34. The method of claim 1, 2, 3, or 4, wherein the transactional account information is stored in fields in records in a computer database.

35. The method of claim 34, wherein the records comprise an account file.

36. The method of claim 34, wherein the records further comprise a transactions file.

37. The method of claim 1, 2, 3, or 4, wherein the digital signature is derived within a hand-held device of the sender.

38. The method of claim 1, 2, 3, or 4, wherein the function of the electronic message comprises applying a hashing algorithm to the electronic message.

* * * * *